41-98.4 SP
IP8306 DP RE 28,368
March 18, 1975 J. F. BONARRIGO, JR Re. 28,368
GRATE BAR ASSEMBLY FOR A ROCK CRUSHER
Original Filed Oct. 3, 1969
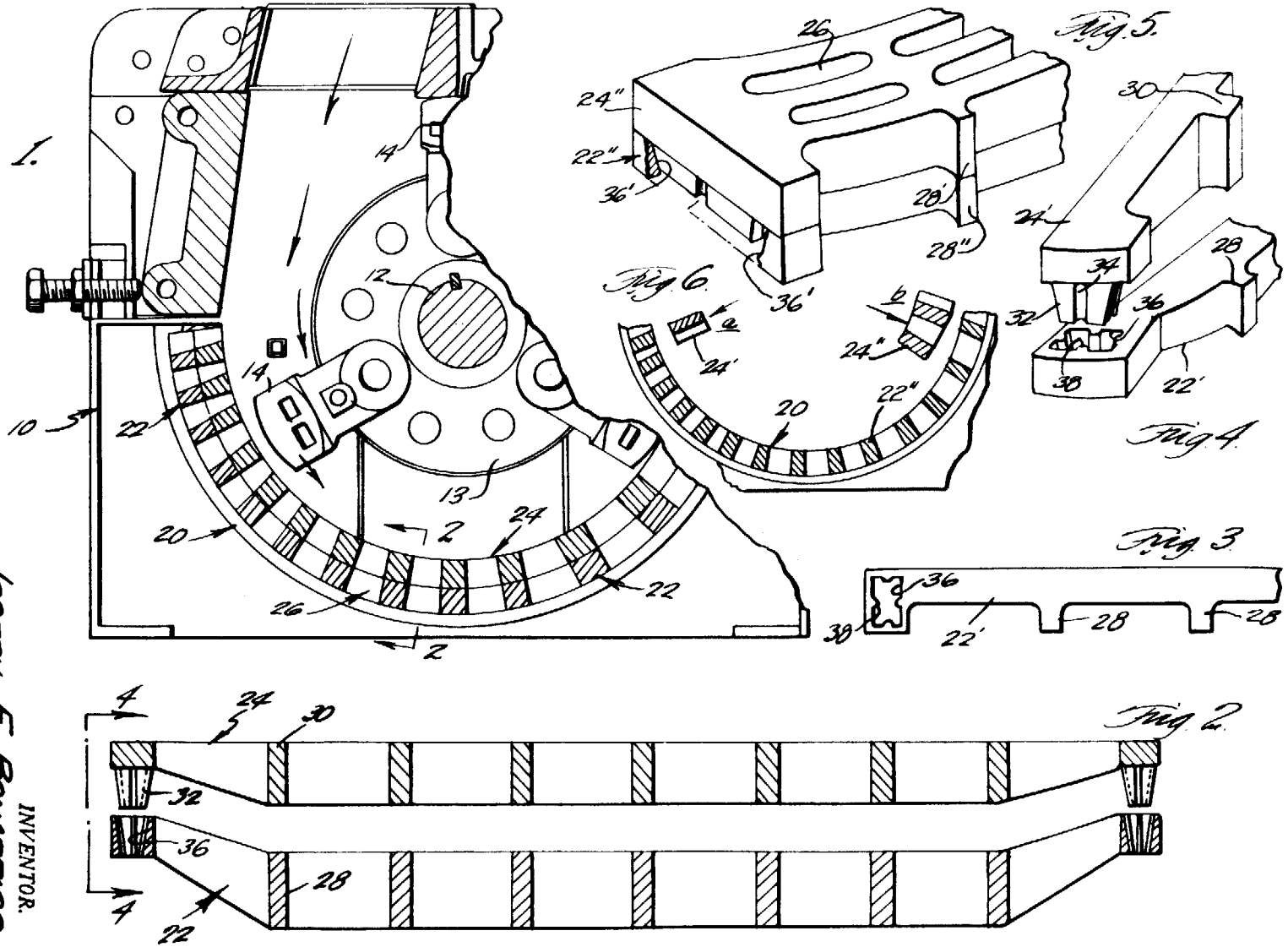
INVENTOR.
JOSEPH F. BONARRIGO, JR.
BY
Floyd A. Bonstel
ATTORNEY United States Patent Re. 28,368
Reissued Mar. 18, 1975

28,368

GRATE BAR ASSEMBLY FOR A ROCK CRUSHER

Joseph F. Bonarrigo, Jr., Sykesville, Md. 21784

Original No. 3,617,007, dated Nov. 2, 1971, Ser. No. 863,428, Oct. 3, 1969. Application for reissue Nov. 1, 1973, Ser. No. 411,642
Int. Cl. B02c *13/13, 13/284*
U.S. Cl. 241—88.4 5 Claims

Matter enclosed in heavy brackets [ ] appears in the original patent but forms no part of this reissue specification; matter printed in italics indicates the additions made by reissue.

ABSTRACT OF THE DISCLOSURE

A rock or ore crusher is provided with a grate bar assembly through which falls comminuted material as it is triturated by the impact member moving within the crusher. Such grate bar assembly is fabricated of abrasive resistant metal and is relatively expensive. The grate assembly of the present invention is constructed of a lower grate section and an upper grate section which may be replaced when worn or abraded without the necessity of replacement of the lower grate section. Interlocking means secures the sections together.

The present invention provides a new and novel grate assembly for a hammer mill or other rock or ore crusher.

The primary object of the present invention is to reduce the expense connected with maintaining a rock or ore crusher grate assembly in efficient operation and condition.

Another object of the present invention is to reduce the material loss when replacing worn grate bar elements in a hammer mill or other comminuting apparatus.

A further object of the present invention is to provide, in a rock crusher, a grate bar assembly having a more or less permanently installed lower section subject to minimal wear and one which may be fabricated of less expensive steel than manganese steel and in combination with a replaceable top section.

A still further object of the present invention is to provide a grate assembly having many interchangeable grate bar elements so as to accommodate various wear conditions in a rock or ore crusher apparatus.

These and other objects of the present invention will be apparent from the following description when taken in connection with the annexed drawing in which:

FIG. 1 is a side elevational view of a hammer mill with portions broken away, showing the grate bar assembly of the present invention installed therein.

FIG. 2 is a side elevational, exploded view of the grate bar assembly according to the present invention, and portions being shown in section, and as seen on line 2—2 of FIG. 1.

FIG. 3 is a top view of an end portion of one of the upper grate bar elements.

FIG. 4 is an exploded view in perspective of end portions of the upper and lower grate bar elements of the present invention as seen on line 4—4 of FIG. 2 and on a larger scale.

FIG. 5 is a view in perspective of end portions of multiple grate bar elements of the present invention with portions broken away, and FIG. 6 is an exploded end view in section of a one-piece lower grate bar element with a single grate bar upper element at a and a multiple grate bar upper element at b.

With reference to the drawing in detail, in FIG. 1 the numeral 10 designates a hammer mill of conventional construction having a shaft 12 carrying a rotor 13 and hammers 14. The numeral 20 designates the improved grate bar assembly according to the present invention having lower grate bar elements 22 and upper grate bar elements 24 arranged with the lower faces of the elements 24 in superimposed abutting relation with respect to the upper faces of the elements 22.

Openings, indicated generally at 26 in FIG. 1, extend through the grate bar assembly 20 and provide passages for the comminuted material as triturated by the action of the hammers 14 whirling in close paths with respect to the upper faces of the upper grate bar elements 24.

An important feature of the present invention is that the grate bar assembly 20 may be fabricated of a one-piece lower grate element or of several types of lower bar elements 22 and upper bar elements 24, so that many combinations of bar elements may be made to enable the used of the mill to most efficiently operate and at the lowest cost of maintenance.

In FIGS. 3 and 4 it will be seen that the lower grate bar element 22' is a single bar having spaced bosses 28 projecting from one side and which—with the abutting side of the next adjacent bar element—form the openings 26.

Similarly, the upper bar element 24', as seen in FIG. 4, is a single bar with bosses 30 also forming the openings 26 when in place in the mill 10 with other upper bar elements 24' in side-by-side abutting relation.

In FIG. 5 is shown another embodiment of the present invention in which a lower grate bar element 22'', and an upper grate bar element 24'', is of multiple construction and each having the equivalent of three single bars having a plurality of openings 26 and having on one side bosses 28' and 28'' respectively.

In FIG. 6 the grate bar assembly 20 has a one-piece lower bar element 22'' which accommodates itself for use either with a single bar element 24', as at a, or with a multiple bar element 24'', as at b.

A further feature of the invention is the provision of interlocking means for the upper and lower bar elements, in either the single or multiple form of each. This comprises, in a preferred embodiment as shown in FIGS. 3 and 4, a tongue 32 depending from the lower face of the upper bar element 24'. The tongue 32 tapers inwardly from its upper end to its free end and is provided on each of its four faces with a groove 34.

The lower bar element 22' is provided in each of its end portions with an opening or socket, as at 36 in FIGS. 3 and 4, conformably-shaped to releasably receive the adjacent tongue 32. Each of the sidewalls of the socket 36 is provided with a longitudinally extending ridge or boss 38 which is conformably-shaped to snugly fit into the respective groove 34 of the adjacent tongue 32 when the upper and lower bar elements 24' and 22' respectively are assembled to form the complete grate bar assembly 20, as in FIG. 1.

In FIG. 5 the multiple type of lower bar element 22'' is shown to have a socket 36' so as to interlock with a similarly formed tongue on a multiple type of upper bar element 24''.

A feature of the interlocking tongues and sockets is that they rigidly lock the lower and upper bar elements together when assembled and are easily separated by the application of a tap with a punch through the open end of such a socket, it being understood that each socket extends from the upper face to the lower face of the lower bar element in each of its forms. It has further been found that the provision of the grooves and conformably-shaped bosses add to the rigidity of the assembled grate.

It will be therefore apparent that the provision of multiple bar elements, single bar elements and of the one-piece lower bar element, enable the user of the crushing device to meet all conditions of relatively soft or hard rock, ores, or the like, and that when a particular upper bar element or set of upper bar elements have been worn to the point of being inefficient, each or all of them are easily and quickly removed and replaced with new top grate bar elements in any desired combination. While the provision of the tongues and socket is believed to enhance the invention, they may be omitted from the end portions of the upper and lower bar elements and the upper bar elements clamped, bolted, or otherwise secured in the mill as is presently practiced with grate bar structures not having the upper and lower elements of the present invention.

The assembly of upper and lower bar elements to form the grate assembly permits the use of metals and alloys having relatively great strength and relatively low resistance to abrasion for the supporting lower bar elements, with the upper bar elements fabricated of metals or alloys having the greatest resistance to abrasive wear without undue regard to inherent strength.

The objects of the present invention are therefore met and while only preferred forms of the invention have been shown and described, it is to be understood that other embodiments of the invention are contemplated and may be practiced within the scope and terminology of the appended claims.

I claim:

1. In an apparatus for comminuting rock, ore, or the like, such apparatus having an open upper end, an open lower end, and an impacting member disposed between said upper end and said lower end and adapted to comminute material received through said upper end.

ing grove, and a grate device extending inwardly of and adjacent said apparatus lower end and in the path of movement of material comminuted by said member, said device including at least one lower element having an upper face and a lower face, and removably secured to said apparatus, at least one upper element having an upper face and a lower face positioned in superimposed abutting relation with respect to said lower element, said upper element and said lower element being provided with cutaway portions extending from the respective upper faces to the respective lower faces for the passage therethrough of comminuted material, the cutaway portions of said upper and lower elements being in registry, and interlocking means carried by said upper and lower elements, said means comprising a tongue depending from the lower face of said upper element releasably received in an opening extending from the upper face of said lower element to the lower face of said lower element.

2. The apparatus according to claim 1, in which said tongue is provided with at least one longitudinally extending groove, and a longitudinally extending boss in the adjacent wall of said opening, said boss being conformably shaped to said groove.

3. The apparatus according to claim 1, in which said tongue tapers inwardly from the upper end to the lower end thereof.

*4. A grate bar assembly for a rock crusher comprising: at least one lower grate element having bars spaced by openings extending from the upper face to the lower face thereof,*

*and at least one upper grate element having bars spaced by openings extending from the upper to the lower face thereof,*

*said upper grate element being supported on said lower grate element for ready removal and replacement when worn,*

*the openings in said upper grate element being of a size to permit passage therethrough of crushed material of a desired diameter,*

*the openings in said lower grate element being of size at least equal to the size of the openings in said upper grate element so as to not impede passage therethrough of such material passed through the openings in said upper grate element,*

*the openings in said upper and lower grate elements being in registry,*

*said upper grate element being formed of high abrasion resistant metal,*

*said lower grate element being formed of metal of high strength.*

*5. A rock or ore crusher comprising a shaft journaled within a housing for rotation, a rotor carried by said shaft, hammers carried by said rotor, a grate bar assembly within said housing adjacent to and spaced from said rotor and adapted to coact with said hammers to crush and reduce in size material when placed in said housing, said assembly including an upper grate element formed of high abrasion resistant metal, a lower grate element formed of a metal of high strength supporting said upper grate element for ready removal of said upper grate element for replacement when worn, each of said upper and lower grate elements having bars spaced by openings extending from the upper faces to the lower faces thereof, the openings of said upper grate element being of a size to permit passage therethrough of crushed material of a desired diameter,*

*the openings of said lower grate element being of a size at least equal to the size of the openings of said upper grate element so as not to impede passage therethrough of such material passed through the openings in said upper grate element, the openings in said upper and lower grate elements being in registry.*

References Cited

The following references, cited by the Examiner, are of record in the patented file of this patent or the original patent.

UNITED STATES PATENTS

| | | | |
|---|---|---|---|
| 2,360,357 | 10/1944 | Marshall | 241—89.3 |
| 1,950,713 | 3/1934 | Crawford | 241—95 |
| 2,530,862 | 11/1950 | Cornell | 241—91 |
| 2,890,840 | 6/1959 | Fletcher | 241—86 X |
| 2,465,056 | 3/1949 | Bond | 241—88 |
| 763,639 | 6/1904 | Schoellhorn | 241—88 |
| 2,826,371 | 3/1958 | Smith | 241—300 |
| 1,367,777 | 2/1921 | Hardinge | 241—182 X |

DONALD G. KELLY, Primary Examiner

U.S. Cl. X.R.

241—89.2, 294